US011447254B2

(12) United States Patent
Carrick et al.

(10) Patent No.: US 11,447,254 B2
(45) Date of Patent: Sep. 20, 2022

(54) PASSENGER SEAT WITH SUPPORT STRUCTURE INCLUDING OFFSET STRUTS

(71) Applicant: BOMBARDIER INC., Dorval (CA)

(72) Inventors: Christopher Carrick, Toronto (CA); Neil Trivers, Richmond Hill (CA); Il Yong Kim, Kingston (CA)

(73) Assignee: BOMBARDIER INC., Dorval (CA)

( * ) Notice: Subject to any disclaimer, the term of this patent is extended or adjusted under 35 U.S.C. 154(b) by 268 days.

(21) Appl. No.: 16/955,956

(22) PCT Filed: Dec. 18, 2018

(86) PCT No.: PCT/CA2018/051617
§ 371 (c)(1),
(2) Date: Jun. 19, 2020

(87) PCT Pub. No.: WO2019/119126
PCT Pub. Date: Jun. 27, 2019

(65) Prior Publication Data
US 2020/0324905 A1 Oct. 15, 2020

Related U.S. Application Data

(60) Provisional application No. 62/639,108, filed on Mar. 6, 2018, provisional application No. 62/608,717, filed on Dec. 21, 2017.

(51) Int. Cl.
*B64D 11/06* (2006.01)
(52) U.S. Cl.
CPC ........ *B64D 11/0648* (2014.12); *B64D 11/064* (2014.12); *B64D 11/0696* (2013.01)

(58) Field of Classification Search
CPC ...... B64D 11/0648; B64D 11/064; B60N 2/10
See application file for complete search history.

(56) References Cited

U.S. PATENT DOCUMENTS 3,480,240 A 11/1969 Del Giudice
4,060,279 A 11/1977 Vogel
(Continued)

FOREIGN PATENT DOCUMENTS

CA 3036019 A1 * 9/2019 ............... B60N 2/06
EP 3517434 A1 * 7/2019 ............. B60N 2/143
(Continued)

OTHER PUBLICATIONS

International Searching Authority, PCT international Search Report and Written Opinion dated Feb. 8, 2019 re: International Application No. PCT/CA2018/051617.

*Primary Examiner* — Timothy J Brindley
(74) *Attorney, Agent, or Firm* — Norton Rose Fulbright Canada LLP

(57) ABSTRACT

A passenger seat for an aircraft, including a bottom support configured to be connected to a floor of the aircraft, a seat pan frame, and a support structure interconnecting the seat pan frame to the bottom support, the support structure including a front support member pivotally connected to a front end of the seat pan frame, the front support member including a respective strut on each side of the seat pan frame, each respective strut having a bottom end rigidly connected to the bottom support and an opposed top end located under the seat pan frame, the bottom end being inwardly, downwardly and rearwardly offset with respect to the top end.

20 Claims, 4 Drawing Sheets

(56) References Cited

U.S. PATENT DOCUMENTS

| | | | |
|---|---|---|---|
| 4,349,167 A | | 9/1982 | Reilly |
| 4,395,011 A | * | 7/1983 | Torta .................. B60N 2/10 297/335 |
| 5,344,210 A | | 9/1994 | Marwan et al. |
| 5,676,336 A | | 10/1997 | Nefy et al. |
| 5,913,567 A | | 6/1999 | Novak et al. |
| 2002/0171282 A1 | * | 11/2002 | Seibold ................ B60N 2/10 297/452.18 |
| 2015/0307194 A1 | * | 10/2015 | Oleson ................ B60N 2/919 297/217.2 |
| 2016/0023769 A1 | | 1/2016 | Zheng et al. |
| 2017/0253337 A1 | | 9/2017 | Crozat et al. |
| 2019/0031050 A1 | * | 1/2019 | Fitzpatrick ............. A61G 5/14 |

FOREIGN PATENT DOCUMENTS

| | | | | |
|---|---|---|---|---|
| WO | WO-9967105 A1 | * | 12/1999 | ........... B60N 2/4221 |
| WO | WO-2014163580 A1 | * | 10/2014 | ......... B64D 11/0619 |
| WO | WO-2015101895 A1 | * | 7/2015 | ............. B64D 11/06 |
| WO | WO-2019119123 A1 | * | 6/2019 | ............. B60N 2/14 |
| WO | WO-2021021162 A1 | * | 2/2021 | ............. B60N 2/015 |

\* cited by examiner

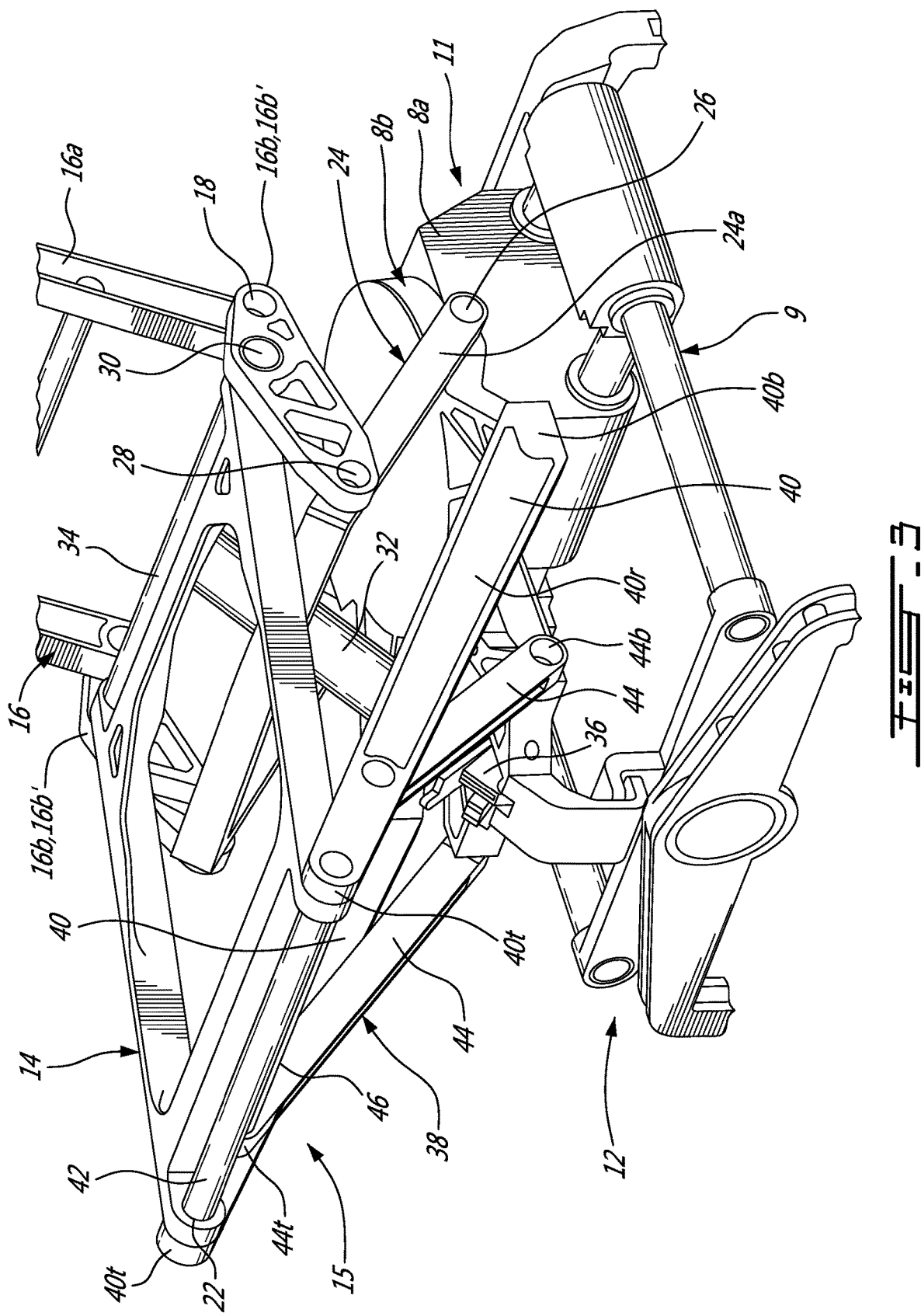

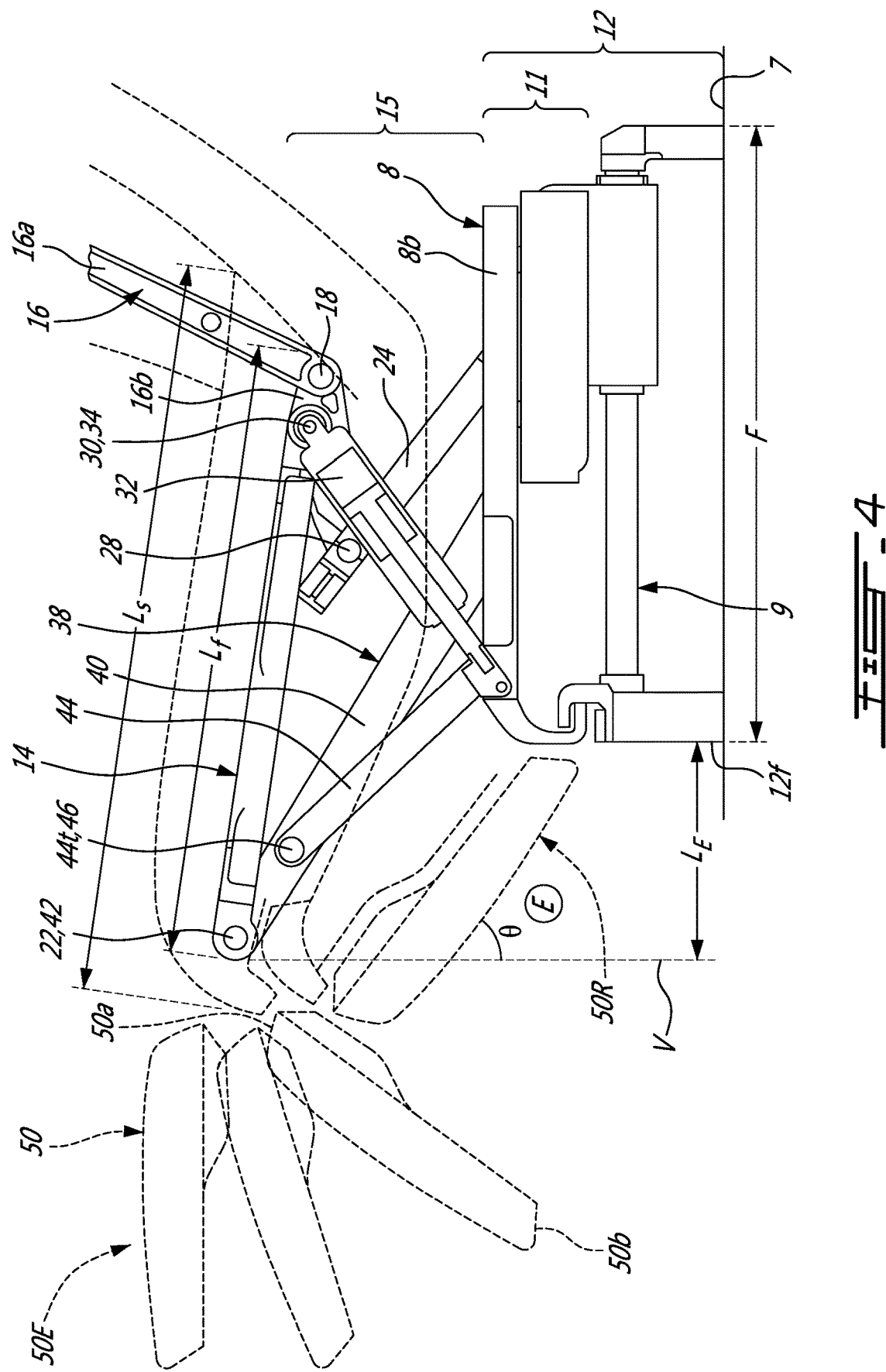

PASSENGER SEAT WITH SUPPORT STRUCTURE INCLUDING OFFSET STRUTS

CROSS-REFERENCE TO RELATED APPLICATION(S)

This application is a national phase application under 35 U.S.C. 371 of International Patent Application No. PCT/CA2018/051617 filed on Dec. 18, 2018, which claims priority from U.S. Provisional Patent Application Ser. No. 62/608,717 filed on Dec. 21, 2017 and 62/639,108 filed on Mar. 6, 2018, the entire content of both of which is incorporated herein by reference.

TECHNICAL FIELD

The application relates generally to aircraft passenger seats and, more particularly, to support structures for such seats.

BACKGROUND OF THE ART

Aircraft passenger seats are typically supported by relatively bulky bases and support structures that are designed from a two-dimensional approach: for example, the support structure is designed upon consideration of load paths in a central plane, then offset on each side to define side supports connected to the seat pan frame, and the side supports are interconnected by perpendicular support members. Accordingly, the footprint of the seat corresponds to or is similar to the dimensions of the seat pan. When the occupant of the seat leans forward, for example to work or eat at a table, the lack of available leg room can cause discomfort and lead for example to back pain.

SUMMARY

In one aspect, there is provided a passenger seat for an aircraft, the seat comprising: a bottom support configured to be connected to a floor of the aircraft; a seat pan frame; and a support structure interconnecting the seat pan frame to the bottom support, the support structure including a front support member pivotally connected to a front end of the seat pan frame, the front support member including a respective strut on each side of the seat pan frame, each respective strut having a bottom end rigidly connected to the bottom support and an opposed top end located under the seat pan frame, the bottom end being inwardly, downwardly and rearwardly offset with respect to the top end.

In another aspect, there is provided a passenger seat for an aircraft, the seat comprising: a fixed portion configured to be connected to a floor of the aircraft, the fixed portion defining a footprint of the seat on a surface of the floor; a movable connection assembly engaged to the fixed portion and movable with respect thereto; a seat pan frame; and a support structure interconnecting the seat pan frame to the movable connection assembly, the support structure including a front support member pivotally connected to a front end of the seat pan frame, the front support member including a respective strut on each side of the seat pan frame, each respective strut having a bottom end connected to the movable connection assembly and an opposed top end located under the seat pan frame, the bottom end being inwardly, downwardly and rearwardly offset with respect to the top end.

In particular embodiments, the front support member of the passenger seats described above may further include a respective leg on each side of the seat pan frame, each respective leg having a top end pivotally connected to the seat pan frame and a bottom end rigidly connected to the bottom support or to the movable connection assembly, and wherein on each side of the seat pan frame the top end of the respective strut is rigidly connected to the respective leg, the respective strut extending inwardly from the respective leg. In particular embodiments, such a seat may include any one or any suitable combination of the following:
  the bottom end of the respective strut is located forwardly of the bottom end of the respective leg;
  the legs are parallel to each other;
  the respective leg includes a portion having a thickness smaller than that of a remainder of the respective leg.

In particular embodiments, the passenger seats described above may include any one or any suitable combination of the following:
  the front support member includes a transverse rod connected to the top end of each respective strut;
  a lower backrest member is pivotally connected to a rear end of the seat pan frame at a first location, and the support structure further includes a support arm having a top end pivotally connected to the lower backrest member at a second location spaced from the first location, the support arm having a bottom end pivotally connected to the bottom support or the movable connection assembly;
  the bottom support or movable connection assembly includes a swivel assembly having a first portion configured to have a fixed orientation with respect to the floor and a second portion rotatable relative to the first portion, the bottom end of the respective strut connected to the second portion;
  the bottom support or fixed portion includes rails configured to have a fixed position with respect to the floor and the movable connection assembly is slidingly engaged to the rails.

In a further aspect, there is provided a method of supporting a seat pan frame of a passenger seat above a floor of an aircraft, the method comprising: connecting a bottom support of the seat to the floor; and connecting the seat pan frame to the bottom support with a support structure including pivotally connecting a front end of the seat pan frame with a front support member of the support structure, the front support member including struts rigidly connected to the bottom support and each strut extending simultaneously upwardly, outwardly and frontwardly from the bottom support.

In a particular embodiment, the method further comprises pivotally connecting the seat pan frame to a backrest frame, pivotally connecting the backrest frame to a support arm, and pivotally connecting the support arm to the bottom support.

DESCRIPTION OF THE DRAWINGS

For a better understanding of the present invention, as well as other aspects and further features thereof, reference is made to the following description which is to be used in conjunction with the accompanying drawings, where:
FIG. 3 is a schematic tridimensional view of the seat of FIG. 2 in accordance with a particular embodiment;
and FIG. 4 is a schematic cross-sectional view of the seat of FIG. 3, including a footrest shown in various positions.

DETAILED DESCRIPTION

Figure 1:
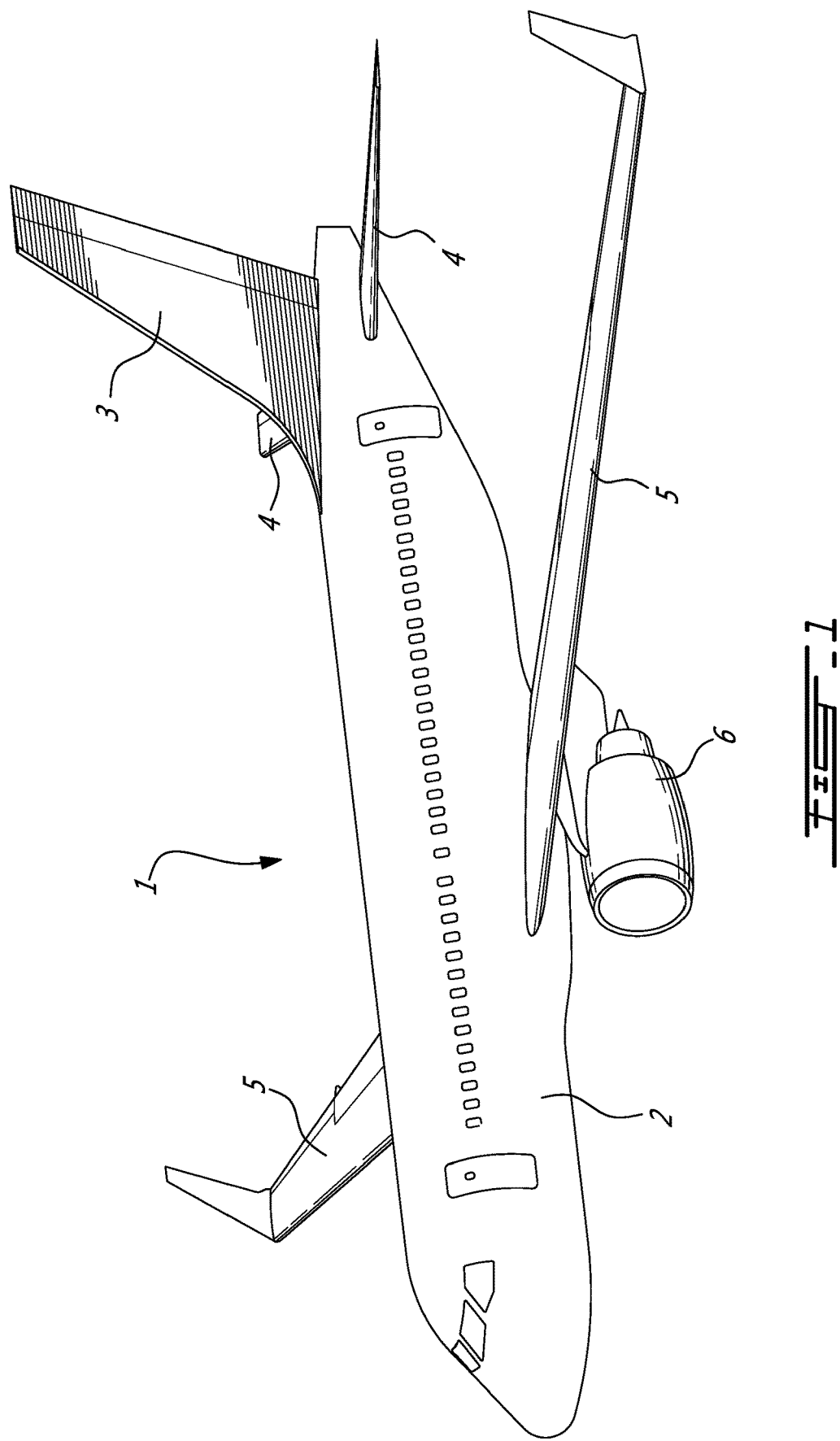
FIG. 1 is a schematic tridimensional view of an aircraft.

Referring to the drawings and more particularly to FIG. 1, an aircraft is shown at 1 and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft. It is also understood that although FIG. 1 shows a commercial aircraft, the aircraft 1 may alternately be any other type of aircraft, including, but not limited to, a business aircraft or a private aircraft.

Figure 2:
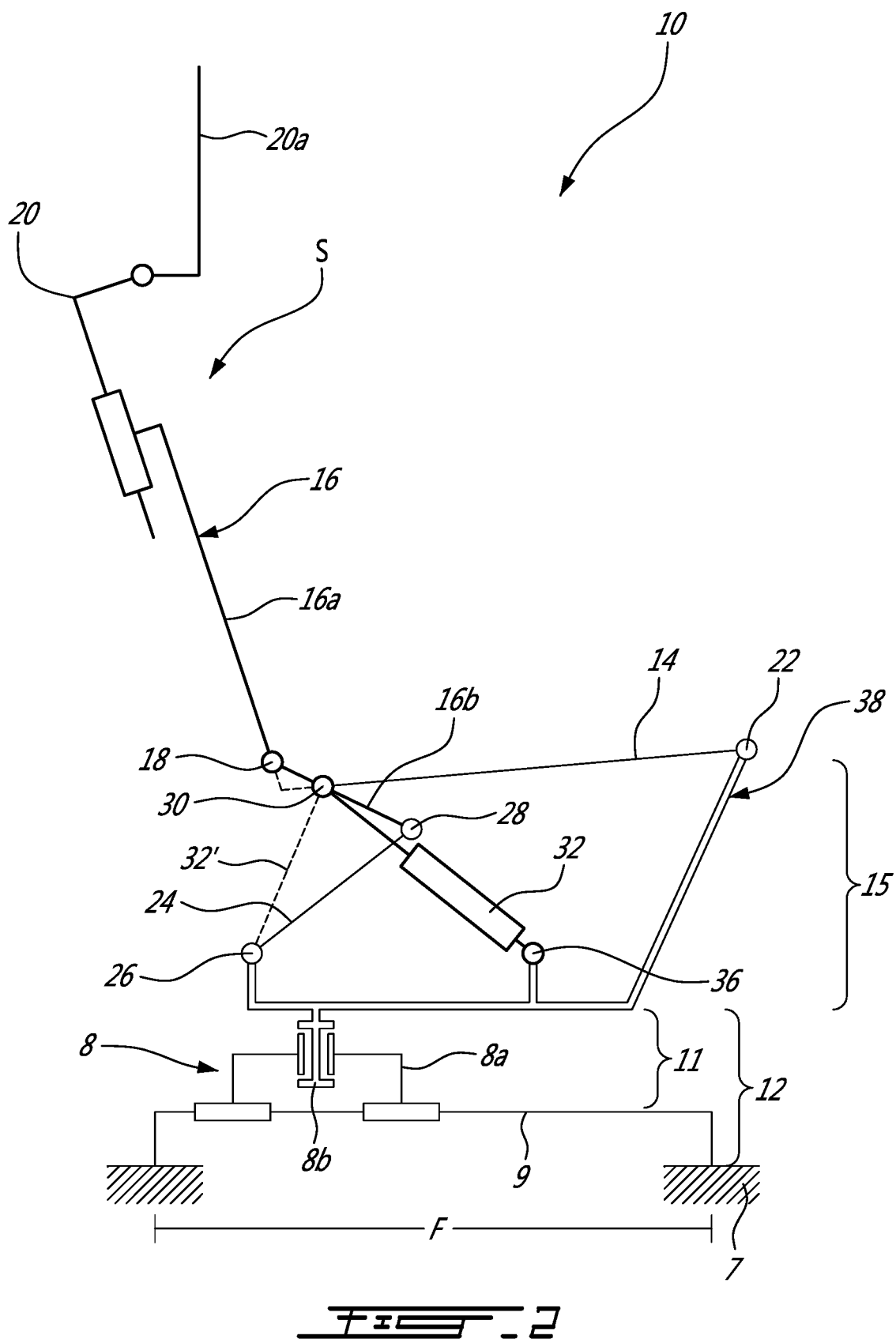
FIG. 2 is a schematic diagram of the a seat which can be used in an aircraft such as shown in FIG. 1, in accordance with a particular embodiment.

Referring to FIG. 2-4, a passenger seat 10 in accordance with a particular embodiment is shown. The passenger seat 10 is configured to be used, for example, in the cabin of an aircraft 1 such as shown in FIG. 1. In an embodiment, the seat 10 is mounted to the floor structure 7 in order to position an occupant of the seat 10 in an aft-facing direction. By "aft-facing", it is understood that the seat 10 is mounted in the fuselage 2 such that the front end of the seat 10 is oriented toward the aft end of the aircraft 1 which supports the tail assembly. In an alternate embodiment, the seat 10 is mounted in the fuselage 2 such that the front end of the seat 10 is oriented toward the fore end of the aircraft 1 at which the cockpit is located. The passenger seat 10 could alternately be any other suitable type of aircraft seat, or be used in any other suitable type of vehicle.

In the present disclosure, including claims, it is understood that the expressions "front", "forward", "forwardly", "rear", "rearwardly" and other similar positional descriptors are used to define the relative location of a component of the seat 10 with respect to other components of the seat 10, where the surface(s) of the seat 10 in contact with the occupant in the taxi, take-off and landing (TTOL) configuration of the seat 10 correspond to the front of the seat, and where the opposed surface(s) of the seat facing away from the occupant correspond to the rear of the seat 10. It is however understood that depending on the orientation of the seat 10 within the aircraft 1, the front of the seat 10 may be facing toward a front, a rear, a side, etc. of the aircraft 1.

Referring particularly to FIG. 2, the seat 10 generally includes a bottom support 12 configured to be connected to a floor 7 of the aircraft, for example to floor beams interconnected to the fuselage 2, a seat pan frame 14 supporting a seat pan (not shown), and a backrest frame 16 supporting a backrest (not shown). The bottom support 12 defines a footprint F of the seat 10 along a surface of the floor 7, and includes a fixed portion 9 configured to be connected to the floor 7 and a movable connection assembly 11 engaged to the fixed portion 9 and movable with respect thereto. In the embodiment shown, the fixed portion 9 includes rails attached to the floor structure 7, and the movable connection assembly 11 is slidingly engaged to the rails and includes a swivel assembly 8. The swivel assembly 8 includes a first portion 8a slidable with respect to the fixed portion 9 and configured to have a fixed orientation with respect to the floor and a second portion 8b rotatable relative to the first portion 8a. The second portion 8b extends forwardly from the first portion 8a so as to be supported in a cantilevered manner from the first portion 8a. The seat pan frame 14 and backrest frame 16 are connected to the bottom support 12, and more particularly in the embodiment shown to the second portion 8b of the swivel assembly 8, by a support structure 15 which is described in greater detail below. Accordingly, the seat pan frame 14 is pivotable via the swivel assembly 8 from a neutral position (as shown), and is slidable via the movable connection assembly 11 between a forwardmost position and a rearwardmost position (as shown). In a particular embodiment, the neutral, rearwardmost position corresponds to the TTOL position.

In a particular embodiment, the seat 10 corresponds to or is similar to the seat described in U.S. provisional application No. 62/608,717 filed Dec. 21, 2017, which is incorporated by reference herein. It is however understood that the configuration of the bottom support 12 shown here is exemplary only and that any other suitable type of bottom support may alternately be used, including, but not limited to, bottom supports including pivoting attachments, sliding attachments, and fixed attachments.

Although not shown, the seat pan and backrest may include any material suitable for providing appropriate support and comfort to the occupant, including, but not limited to, suitable cushioning materials which will not be further described herein. The support structure 15 and interconnection between the seat pan frame 14 and backrest frame 16 allow for the seat 10 to be selectively configurable between the TTOL configuration (shown) and a reclined configuration (not shown).

Still referring to FIG. 2, the backrest frame 16 has an upper backrest member 16a supporting the backrest, and a lower backrest member 16b extending downwardly from a bottom end of the upper backrest member 16a. In the embodiment shown, the upper and lower backrest members 16a, 16b are pivotally interconnected by a selectively lockable pivot connection 18, e.g. a selectively lockable revolute joint. In the present disclosure, including claims, the term "revolute joint" is intended to designate a pivot connection between two members which allows relative pivoting motion between the two members about an axis of rotation without allowing relative translation between the two members, i.e. the axis of rotation has a fixed location with respect to each of the two members. Examples of revolute joints include, but are not limited to, a hinge joint, a pin joint, and a folding joint.

The pivot connection 18 between the upper and lower backrest members 16a, 16b has a locked configuration where a relative pivoting motion between the upper and lower backrest members 16a, 16b is prevented and an unlocked configuration where the relative pivoting motion between the upper and lower backrest members 16a, 16b is allowed. The pivot connection 18 may include, for example, a lock based on a spring-loaded plunger mechanism; any other suitable mechanism may alternately be used. In the embodiment shown, the upper and lower backrest members 16a, 16b are non-parallel when in the locked configuration. It is understood that in an alternate embodiment, the upper and lower backrest members 16a, 16b may be rigidly interconnected.

In the embodiment shown, the backrest frame 16 supports a headrest 20 which is slidingly engaged to a top of the upper backrest member 16a. The headrest 20 may include a pivotable portion 20a allowing for further adjustment of the position of the headrest 20. It is understood that the headrest configuration shown is exemplary only, and that any other suitable headrest configuration may alternately be used; alternately, the adjustable headrest may be omitted.

The rear end of the seat pan frame 14 is pivotally connected to the lower backrest member 16b by a pivot connection 30, which in the embodiment shown is defined by another revolute joint. The pivot connection 30 between the seat pan frame 14 and the lower backrest member 16b is offset from the pivot connection 18 between the backrest members 16a, 16b.

In the embodiment shown, the support structure 15 includes a biasing and/or damping member, for example a gas spring 32 or any suitable type of linear actuator located under the seat pan frame 14. In the embodiment shown, the gas spring 32 has one end pivotally connected to the lower backrest member 16b and to the rear end of the seat pan frame 14 at their pivot connection 30. For example and referring to FIG. 3, the lower backrest member 16b includes two laterally spaced interconnected portions 16b' with the rear end of the seat pan frame 14 extending therebetween. A rod 34 defines the revolute joint of the pivot connection 30 between the lower backrest member portions 16b' and the rear end of the seat pan frame 14, and the end of the gas spring 32 is pivotally engaged to a central portion of the rod 34.

The opposed end of the gas spring 32 is pivotally connected to the second portion 8b of the swivel assembly 8 by a pivot connection 36, which in the embodiment shown is also defined as a revolute joint. In the embodiment shown, the gas spring 32 is connected toward the front of the swivel assembly 8, for example near a front extremity of the second portion 8b at a location forwardly offset from the engagement between the first and second portions 8a, 8b. The connection 36 of the gas spring 32 with the swivel assembly 8 remains forward of its connection 30 with the lower backrest member 16b and seat pan frame 14 throughout the motion of backrest frame 16 and seat pan frame 14. Other configurations are of course possible.

Referring back to FIG. 2, in the embodiment shown, the support structure 15 further includes a support arm 24 interconnecting the backrest frame 16 to the bottom support 12. The support arm 24 has one end pivotally connected to the lower backrest member 16b by a pivot connection 28 defined by another revolute joint. In the embodiment shown, the pivot connection 30 of the lower backrest member 16b with the seat pan frame 14 is located intermediate the pivot connections 18, 28 of the lower backrest member 16b with the upper backrest member 16a and with the support arm 24. Referring now to FIG. 3, in a particular embodiment, the support arm 24 has an inverted U shape defined by a transverse upper member from which extend two laterally spaced rods 24a. The pivot connection 28 between the support arm 24 and the lower backrest member 16b is defined by separate pivots interconnecting the end of each of the lower backrest member portions 16b' to the respective one of the rods 24a, for example adjacent the transverse member.

The rods 24a of the support arm 24 each have an end opposed to the transverse member, and connected to the second portion 8b of the swivel assembly 8 via another pivot connection 26, which in the embodiment shown is also defined as a revolute joint. The pivot connection 26 between the support arm 24 and the second portion 8b of the swivel assembly 8 is located toward the rear of the swivel assembly 8, for example adjacent to or in alignment with the engagement between the first and second portions 8a, 8b of the swivel assembly 8.

Referring to FIGS. 2-4, a frontmost portion of the support structure 15 is defined by a front support member 38. The front support member 38 has a top end connected to the front end of the seat pan frame 14 via a pivot connection 22, which in the embodiment shown is also defined by a revolute joint. The front support member 38 has an opposed bottom end connected to the bottom support 12, more particularly to the second portion 8b of the swivel assembly 8, forwardly of the pivot connection 26 between the support arm 24 and the swivel assembly 8. In the embodiment shown, the connection between the front support member 38 and the bottom support 12 is a rigid connection, i.e. allowing no relative motion between the second portion 8b of the swivel assembly 8 and the front support member 38.

In the embodiment shown and as can be best seen in FIG. 3, the front support member 38 includes a leg 40 on each side of the seat pan frame 14. The legs 40 each have a top end 40t pivotally connected to the front end of the seat pan frame by the pivot connection 22 defined for example by a rod 42. The front end of the seat pan frame 14 is received between the two legs 40 which extend in parallel side planes, and which are parallel to each other; alternately, the legs 40 may be non-parallel. Each leg 40 has a bottom end 40b rigidly connected to the second portion 8b of the swivel assembly 8, for example at a location slightly forward of the engagement between the portions 8a, 8b of the swivel assembly 8. In the embodiment shown, each leg 40 includes a recessed portion 40r having a thickness smaller than that of the remainder of the leg 40, such as to define for example an I-beam type cross-section at and around the recessed portion 40r; such a configuration may allow for example to reduce an overall weight of the seat 10. Other configurations are also possible.

The front support member 38 also includes a strut 44 on each side of the seat pan frame 14. Each strut 44 has a bottom end 44b rigidly connected to the second portion 8b of the swivel assembly 8, for example forwardly of the bottom ends 40b of the legs 40. Each strut 44 also has an opposed top end 44t located under the seat pan frame 14 and rigidly connected to a respective one of the legs 40, downwardly of the pivot connection 22. It can be seen that the bottom end 44b of each strut 44 is inwardly, downwardly and rearwardly offset with respect to its top end 44t. In other words, the struts 44 extend simultaneously upwardly, outwardly and frontwardly from the bottom support 12 to the respective leg 40. The struts 44 are thus not parallel to each other, and the distance between the bottom ends 44b of the struts 44 is smaller than the distance between the bottom ends 40b of the legs 40.

In the embodiment shown, the front support member 38 also includes a transverse rod 46 extending perpendicularly to the legs 40 and interconnecting the top ends 44t of the struts 44. The transverse rod 46 is located under the seat pan frame 14 and rearwardly offset from the front end of the seat pan frame 14. It is understood that alternately, the transverse rod 46 may be replaced by any other suitable type of transverse connection including, but not limited to, a beam, truss or machined part. Moreover, the transverse connection may be located at any other suitable location, including, but not limited to, anywhere between a center of the struts 44 and their top end 44t.

In a particular embodiment, the orientation of the struts 44 allows for the support structure 15, and more particularly the front support member 38, to have a truss architecture; the struts 44 extend at a non-zero angle with respect to parallel vertical planes aligned with the sides of the seat pan frame 14 (vertical planes parallel to the plane of FIGS. 2 and 4), to the vertical plane V aligned with the front end of the seat pan frame 14 (see FIG. 4), and to an horizontal plane (plane parallel to the floor 7). In the embodiment shown, this allows for the support structure 15 to have sufficient strength so that the bottom support 12 of the seat 10 can have a footprint F which is reduced when compared to the dimensions of the seat pan frame 14, which may allow space-savings and weight-savings for the seat 10. Moreover, in a particular embodiment the reduced footprint F allows for more volume for the occupant's feet, such as for example an empty space under the front of the seat pan frame 14, as described in more detail further below.

In a particular embodiment, the truss architecture defines an optimized path for load transfer. This is in contrast with prior seat designs where the load path and geometry were considered and designed in a two-dimensional manner, i.e. flat on the centerline of the seat, offset in both directions from the centerline so the seat pan and backrest could be supported, and then linked together with cross beams perpendicular to the side structures. As opposed to the prior perpendicular members that support most of the loads as shear loads, the angled struts 44 allow for the front support member 38 to work in compression or in tension, significantly reducing or substantially eliminating shear loads and bending moments. This may allow for the support structure 15 to bear stronger loads for a same amount of material when compared to traditional, "two-dimensional" designs.

In a particular embodiment, the front support member 38 and remainder of the support structure 15 are sized and oriented by taking into consideration a desired empty space under the front of the seat pan 14 and the direction and amplitude of the various loads on the seat during use.

It is understood that the configuration of the front support member 38 shown is exemplary only, and that other configurations are possible; for example, the legs 40 may have a different configuration or be replaced by any other structure providing a suitable connection between the struts 44 and the front end of the seat pan frame 14.

Referring particularly to FIG. 4, the configuration of the support structure 15, with the top end of the front support member 38 (e.g. top end 40t of the legs 40) forwardly offset from its bottom end (e.g. bottom end 40b, 44b of the struts 44 and/or legs 40) allows for the front end of the seat pan frame 14 to be forwardly offset from the front end 12f of the bottom support 12. Accordingly, an empty space E is defined between the seat pan frame 14 and the floor 7; the empty space E is defined across a width of the seat 10, forwardly of the support structure 15 (e.g. forwardly of the legs 40 and struts 44), forwardly of the bottom support 12, and rearwardly of the front end of the seat pan frame 14 (e.g. rearwardly of the vertical plane V aligned with the front end of the seat pan frame 14). The space E is defined as "empty" because no element of the seat 10 extends in it; at any height from the floor, the rear border of the empty space E is defined by the forwardmost element of the seat at that height.

In a particular embodiment, the empty space E under the front end of the seat pan frame 14 and defined across the width of the seat allows for leg room under the seat 10 for the occupant leaning forward in the seat 10, which may improve comfort and for example reduce the risk of back pain. In contrast, some prior seats have space under the seat pan frame that does not extend across the width of the seat but rather between structure forming the sides of the seats (e.g. legs); such structure extending on each side of and bordering the space may impede free movement of the occupant's legs under the seat.

In the embodiment shown where the bottom support 12 includes the swivel assembly 8, the empty space E is defined under the seat pan frame 14 at least when the seat is in the neutral position, i.e. with the front of the seat pan frame 14 having the same orientation as the front of the bottom support 12, which in a particular embodiment corresponds to the TTOL configuration. In the embodiment shown where the movable connection assembly 11 is slidingly engaged to the rails 9, the front end of the seat pan frame 14 remains forwardly offset from the front end of the bottom support 12 in the rearwardmost position of the seat pan frame 14, so that the empty space E is present in the rearwardmost position, which in a particular embodiment corresponds to the TTOL configuration. Accordingly, the empty space E under the front end of the seat pan frame 14 is present and the corresponding leg room under the seat pan is available for the occupant in the TTOL configuration.

Still referring to FIG. 4, in a particular embodiment the seat 10 includes a footrest. The footrest 50 is attached to the remainder of the seat 10 so that a first end 50a of the footrest 50 is adjacent the front end of the seat pan frame 14, and the footrest 50 is pivotable about a pivot defined at or in proximity of that first end 50a. For example, the first end 50a may be pivotally connected to the front end of the seat pan frame 14 via a revolute joint. Other configurations are also possible.

The opposed second end 50b of the footrest 50 is spaced from the front end of the seat pan frame 14. When the footrest 50 is in an extended configuration 50E, the second end 50b of the footrest 50 is located forwardly of the front end of the seat pan frame 14. When the footrest is in a retracted configuration 50R, the second end 50b is located under the seat pan frame 14 and aft of the first end 50a, i.e. the footrest 50 is folded so as to be partially or completely contained behind the vertical plane V aligned with the front end of the seat pan frame 14. The empty space E is thus defined forwardly of and under the footrest 50R in the retracted configuration, so that the occupant of the seat 10 has leg room under the front end of the seat 10 despite the presence of the retracted footrest 50R.

In a particular embodiment, the retracted footrest 50R extends at an angle θ of more than 10 degrees with respect to the vertical plane V aligned with the front end of the seat pan frame 14; in a particular embodiment, the angle θ of retracted footrest 50R is about 45 degrees with respect to the vertical plane V. Other values are also possible.

In a particular embodiment and still referring to FIG. 4, a length $L_E$ of the empty space E defined along the surface of the floor 7 from the front of the retracted footrest 50R to the vertical plane V aligned with the front end of the seat pan frame 14 when the seat is in its rearwardmost (TTOL) position corresponds to at least 25%, for example from 25% to 50%, of a length $L_F$ of the seat pan frame and/or of a length $L_S$ of the seat pan (e.g. cushion) supported by the seat pan frame 14. Other values are also possible.

In a particular embodiment and in use, supporting the seat pan frame 14 includes connecting the bottom support 12 to the floor 7, and connecting the seat pan frame 14 to the bottom support 12 with the support structure 15 including pivotally connecting the front end of the seat pan frame 14 with the front support member 38, where the front support member 38 includes the struts 44 rigidly connected to the bottom support 12 and each extending simultaneously upwardly, outwardly and frontwardly from the bottom support 12. In a particular embodiment, supporting the seat pan frame 14 also includes pivotally connecting the seat pan frame 14 to the backrest frame 16, pivotally connecting the backrest frame 16 to the support arm 24, and pivotally connecting the support arm 24 to the bottom support 12.

In a particular embodiment, leg room is provided for the occupant of the seat 10 by connecting the seat pan frame 14 to the bottom support 12 with the support structure 15 so that the front end of the seat pan frame 14 is forwardly offset from the front end of the bottom support 12. This includes connecting the frontmost portion of the support structure 15 to the front end of the seat pan frame 14 at a first location and to the bottom support 12 at a second location rearwardly offset from the first location, such that the empty space E is defined between the seat pan frame 14 and the floor 7, forwardly of the support structure 15, forwardly of the bottom support 12, and rearwardly of the front end of the seat pan frame 14. In a particular embodiment, a footrest 50 is provided and retracted under the seat pan frame 14 so that the empty space E is defined forwardly of the retracted footrest 50R.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. A passenger seat for an aircraft, the seat comprising:
    a bottom support configured to be connected to a floor of the aircraft;
    a seat pan frame; and
    a support structure interconnecting the seat pan frame to the bottom support, the support structure including a front support member pivotally connected to a front end of the seat pan frame, the front support member including a respective strut on each side of the seat pan frame, each respective strut having a bottom end rigidly connected to the bottom support and an opposed top end located under the seat pan frame, the bottom end being inwardly, downwardly and rearwardly offset with respect to the top end.

2. The passenger seat as defined in claim 1, wherein the front support member further includes a respective leg on each side of the seat pan frame, each respective leg having a top end pivotally connected to the seat pan frame and a bottom end rigidly connected to the bottom support, and wherein on each side of the seat pan frame the top end of the respective strut is rigidly connected to the respective leg, the respective strut extending inwardly from the respective leg.

3. The passenger seat as defined in claim 2, wherein the bottom end of the respective strut is located forwardly of the bottom end of the respective leg.

4. The passenger seat as defined in claim 2, wherein the legs are parallel to each other.

5. The passenger seat as defined in claim 2, wherein the respective leg includes a portion having a thickness smaller than that of a remainder of the respective leg.

6. The passenger seat as defined in claim 1, wherein the front support member includes a transverse rod connected to the top end of each respective strut.

7. The passenger seat as defined in claim 1, further comprising a lower backrest member pivotally connected to a rear end of the seat pan frame at a first location, and wherein the support structure further includes a support arm having a top end pivotally connected to the lower backrest member at a second location spaced from the first location, the support arm having a bottom end pivotally connected to the bottom support.

8. The passenger seat as defined in claim 1, wherein the bottom support includes a swivel assembly having a first portion configured to have a fixed orientation with respect to the floor and a second portion rotatable relative to the first portion, the bottom end of the respective strut connected to the second portion.

9. The passenger seat as defined in claim 1, wherein the bottom support includes rails configured to have a fixed position with respect to the floor and a movable connection assembly slidingly engaged to the rails.

10. A passenger seat for an aircraft, the seat comprising:
    a fixed portion configured to be connected to a floor of the aircraft, the fixed portion defining a footprint of the seat on a surface of the floor;
    a movable connection assembly engaged to the fixed portion and movable with respect thereto;
    a seat pan frame; and
    a support structure interconnecting the seat pan frame to the movable connection assembly, the support structure including a front support member pivotally connected to a front end of the seat pan frame, the front support member including a respective strut on each side of the seat pan frame, each respective strut having a bottom end connected to the movable connection assembly and an opposed top end located under the seat pan frame, the bottom end being inwardly, downwardly and rearwardly offset with respect to the top end.

11. The passenger seat as defined in claim 10, wherein the front support member further includes a respective leg on each side of the seat pan frame, each respective leg having a top end pivotally connected to the seat pan frame and a bottom end rigidly connected to the movable connection assembly, and wherein on each side of the seat pan frame the top end of the respective strut is rigidly connected to the respective leg, the respective strut extending inwardly from the respective leg.

12. The passenger seat as defined in claim 11, wherein the bottom end of the respective strut is located forwardly of the bottom end of the respective leg.

13. The passenger seat as defined in claim 11, wherein the legs are parallel to each other.

14. The passenger seat as defined in claim 10, wherein the respective leg includes a portion having a thickness smaller than that of a remainder of the respective leg.

15. The passenger seat as defined in claim 10 wherein the front support member includes a transverse rod connected to the top end of each respective strut.

16. The passenger seat as defined in claim 10, further comprising a lower backrest member pivotally connected to a rear end of the seat pan frame at a first location, and wherein the support structure includes a support arm having a top end pivotally connected to the lower backrest member at a second location spaced from the first location, the support arm having a bottom end pivotally connected to the movable connection assembly.

17. The passenger seat as defined in claim 10, wherein the movable connection assembly includes a swivel assembly having a first portion configured to have a fixed orientation with respect to the floor and a second portion rotatable relative to the first portion, the bottom end of the respective strut connected to the second portion.

18. The passenger seat as defined in claim 10, wherein the fixed portion includes rails and the movable connection assembly is slidingly engaged to the rails.

19. A method of supporting a seat pan frame of a passenger seat above a floor of an aircraft, the method comprising:
- connecting a bottom support of the seat to the floor; and
- connecting the seat pan frame to the bottom support with a support structure including pivotally connecting a front end of the seat pan frame with a front support member of the support structure, the front support member including struts rigidly connected to the bottom support and each strut extending simultaneously upwardly, outwardly and frontwardly from the bottom support.

20. The method as defined in claim 19, further comprising pivotally connecting the seat pan frame to a backrest frame, pivotally connecting the backrest frame to a support arm, and pivotally connecting the support arm to the bottom support.

\* \* \* \* \*